UNITED STATES PATENT OFFICE.

JOHN J. LANDSBERGER, OF DOUGLAS, MINNESOTA.

COMPOSITION FOR CURING TWINE.

1,127,649.      Specification of Letters Patent.      Patented Feb. 9, 1915.

No Drawing.      Application filed December 19, 1913. Serial No. 807,699.

*To all whom it may concern:*

Be it known that I, JOHN J. LANDSBERGER, citizen of the United States, residing at Douglas, in the county of Dakota and State of Minnesota, have invented certain new and useful Improvements in Compositions for Curing Twine, of which the following is a specification.

The present invention relates to a new and useful composition of matter adapted to be employed in the treatment of twine and the like for the purpose of waterproofing the twine and at the same time rendering it immune from the attacks of grasshoppers, crickets, and other insects and vermin.

My composition consists of the following ingredients, combined in the proportions stated, namely, oil of tar 40%, spirits of turpentine 16%, kerosene oil 40%, powdered asafetida 4%. These ingredients are to be thoroughly mixed by agitation so as to obtain a perfectly homogeneous liquid compound through which the twine can be drawn or which may be applied to the twine in any suitable manner.

The compound is more particularly designed to be employed for treating the twine which is used in connection with binding machines for securing bundles of grain. In some parts of the country this twine by means of which the bundles of grain are bound together appears to be peculiarly subject to attack by grasshoppers, crickets, and other insects, with the result that the twine is frequently gnawed completely through, or so greatly weakened that the bundles of grain are broken when an attempt is made to remove the same. This results in annoyance and delay, and also in a loss of much of the grain which could otherwise be saved. The twine may be treated with this compound either directly upon the binder or before being applied to the binder, and this compound not only renders the twine waterproof, but also makes it immune from the attacks of grasshoppers, crickets, and like insects.

While the compound is peculiarly adapted for the purpose of treating the twine used in connection with binders for securing bundles of grain, it may also be utilized in twine and rope factories for curing and waterproofing purposes.

Having thus described the invention, what I claim as new and desire to secure by Letters Patent, is:—

The herein described composition of matter for the treatment of twine and the like, consisting of oil of tar 40%, spirits of turpentine 16%, kerosene oil 40%, and powdered asafetida 4%.

In testimony whereof I affix my signature in presence of two witnesses.

JOHN J. LANDSBERGER.

Witnesses:
    P. S. ASLAKSON,
    P. H. CREMER.

Copies of this patent may be obtained for five cents each, by addressing the "Commissioner of Patents, Washington, D. C."